United States Patent [19]

Schatz

[11] Patent Number: 5,044,423
[45] Date of Patent: Sep. 3, 1991

[54] METHOD AND AN ARRANGEMENT FOR DISCONNECTING A HEAT EXCHANGER CHARGED WITH A HEAT VEHICLE FLUID AND PLACED IN THE PATH OF EXHAUST GAS FROM AN IC ENGINE

[76] Inventor: Oskar Schatz, Waldpromenade 16, D 8035, Gauting, Fed. Rep. of Germany

[21] Appl. No.: 535,427

[22] Filed: Jun. 8, 1990

[51] Int. Cl.$^5$ .................. F28F 27/02; F28D 20/00
[52] U.S. Cl. ........................... 165/10; 165/51; 165/32; 165/104.11; 123/41.14
[58] Field of Search ............ 165/104.11, 51, 52, 165/41, 10, 32; 123/41.14; 237/12.3 B

[56] References Cited

U.S. PATENT DOCUMENTS

| | | | |
|---|---|---|---|
| 2,016,179 | 10/1935 | Rosenquist | 123/41.14 |
| 3,986,665 | 10/1976 | Kofink et al. | 165/52 |
| 4,087,047 | 5/1978 | Wulf et al. | 237/12.3 B |
| 4,556,171 | 12/1985 | Fukami et al. | 123/41.14 |
| 4,781,242 | 11/1988 | Meijer et al. | 165/41 |

Primary Examiner—Albert W. Davis, Jr.
Attorney, Agent, or Firm—Harness, Dickey & Pierce

[57] ABSTRACT

For the disconnection of a heat transfer circuit placed in the exhaust gas flow path of an IC engine and containing a flowable heat vehicle liquid connecting with a heat absorbing means, the said vehicle fluid is withdrawn from the heat exchanger and transferred to a storage means, whence it may be transferred back to the heat exchanger when same is to be reconnected.

8 Claims, 1 Drawing Sheet

METHOD AND AN ARRANGEMENT FOR DISCONNECTING A HEAT EXCHANGER CHARGED WITH A HEAT VEHICLE FLUID AND PLACED IN THE PATH OF EXHAUST GAS FROM AN IC ENGINE

BACKGROUND OF THE INVENTION

The invention relates to a method for the connection and disconnection of a heat exchanger placed in the path of exhaust gas from an IC engine. More particularly, the invention relates to such a method using a heat exchanger having a heat transfer circuit containing a heat vehicle fluid connected with a heat absorbing means. The invention also relates to an arrangement for performing the method.

During the operation of an IC engine and more especially of an IC engine in an automobile, it is possible, quite independently of the ambient temperature, the loading of the engine and its speed of rotation, for exhaust gas temperatures to occur, which lead to the overheating of the heat vehicle fluid in a heat transfer circuit heated by the exhaust gas and/or of the heat absorbing means, arranged in such heat transfer circuit, as for example in the form of a heat storage means.

If there is in fact such a danger of overheating, it is necessary for the heat exchanger to be able to connected and disconnected in accordance with a preset parameter.

There has already been a proposal to effect this by providing a bypass for the heat exchanger so that the exhaust gas may be caused to flow through the heat exchanger or to bypass it. This system requires mechanical setting devices, which are liable to fail, in the exhaust gas current and results in alternating effects on the exhaust gas current, which are undesired since the exhaust gas system is usually a complex one which is designed to bring about a balance between the states of pulsation or oscillation which occur.

SHORT SUMMARY OF THE PRESENT INVENTION

One object of the present invention is to provide an improved form of the initially mentioned method such that the flow of exhaust gas is not affected and the connection and disconnection of the heat exchanger may be performed in a simple, effective and reliable manner.

A further object of the invention is to provide such a system which takes into account the economics of production.

In order to achieve these or other objects appearing from the present specification, claims and drawing, to disconnect the heat exchanger heat vehicle fluid is withdrawn from it and is fet to a storage means.

When the temperature of the exhaust gas is such that the exhaust gas might lead to impairment of the vehicle fluid or the heat absorbing means served thereby, the heat exchanger is emptied so that the heat vehicle fluid is no longer subject to the effect of the temperature of the exhaust gas and the transfer of heat from the exhaust gas to the heat absorbing means is interrupted. When this takes place there is no effect on the exhaust gas current and any flow setting or flow control means needed are clear of the flow path of the exhaust gas.

In accordance with a first advantageous embodiment of the invention the heat vehicle fluid is pumped by a pump from the storage means, placed at a lower level than the heat exchanger, through the heat exchanger and for switching off the heat exchanger the pump is turned off. In this case the heat exchanger empties automatically owing to the effect of gravity when the pump is turned off, while on the other hand when the heat exchanger is connected, the heat vehicle fluid has to be passed by the pump to the heat exchanger.

In keeping with another advantageous development of the invention the heat vehicle fluid is passed by a pump through the heat exchanger and for disconnecting the heat exchanger the heat transfer circuit is shut off in the direction of pumping between the storage means and the heat exchanger and the latter is emptied by the pump into the storage means, which is placed at a higher level than the heat exchanger, whereafter the pump is then turned off. In this form of the invention the pump has to empty the heat exchanger when the latter is to be disconnected or made nonoperational. When the heat exchanger is put into operation however the heat vehicle fluid passes automatically into the heat exchanger owing to the effect of gravity.

In the case of another possible useful form of the invention use is made of a heat vehicle fluid which is able to condense within the operating temperature range of the heat absorbing means and the fluid condensing in the heat absorbing means is returned under the effect of gravity via the storage means to the heat exchanger and for disconnecting the heat exchanger the return connection between the storage means and the heat exchanger is interrupted. In this case there is no requirement for a pump and all that is required for the connection and disconnection of the heat exchanger is a shut off valve in the return line. The heat vehicle fluid evaporates in the heat exchanger, condenses with the surrender of heat in the heat absorbing means and then runs as a condensate back to the heat exchanger. If the return path is interrupted, only the part of the heat vehicle fluid in the heat exchanger will be evaporated, following which the heat exchanger sill remain empty until the condensate is allowed to return to the heat exchanger.

An arrangement suitable for performing the method in accordance with the invention for connecting and disconnecting a heat exchanger arranged on the exhaust gas flow path of an IC engine and which is connected by way of a heat transfer circuit containing a heat vehicle fluid with a heat absorbing means, is designed in such a manner that the heat exchanger is placed at a higher level than a compensating container arranged in the heat transfer circuit for the heat vehicle fluid and the pump is arranged at a lower level than the neutral or resting level in the compensating container and in the direction of pumping between the compensating container and the heat exchanger.

In accordance with a still further possible arrangement for performing the method in accordance with the invention the heat exchanger is placed lower down than a compensating container for the heat vehicle and arranged in the circuit and in the direction of flow between the compensating container and the heat exchanger a shut off valve is placed and between the heat exchanger and the compensating container the following are placed in sequence: a check valve and the heat absorbing means.

A still further development of the invention is possible for connecting and disconnecting a heat exchanger placed in the exhaust gas flow path, such heat exchanger being connected with a heat absorbing means by way of a heat transfer circuit so as to provide a further possible way of performing the novel method, in which the heat transfer circuit comprises a heat vehicle fluid arranged to condense in the operating temperature range of the heat absorbing means, the heat absorbing means being arranged placed higher up than the heat exchanger and the heat transfer circuit comprises a condensate return duct opening into the heat exchanger and furthermore such condensate return duct comprises a storage means and there is a valve means for shutting off the condensate return duct between the storage means and the heat exchanger.

Although the above explanations of the invention have been presented on the assumption that the heat exchange in the exhaust gas flow path constitutes the heat source, the conditions may be reversed even during operation without impairing the effect in accordance with the invention, that is to say for instance when starting up an IC engine from cold a heat storage means, which has previously been heated up by the exhaust gas as a heat absorbing means, may be used as a source of heat and then the heat exchanger serving as the heat absorbing means may transfer its heat to the exhaust gas, as for instance to accelerate starting up of an exhaust gas catalytic converter or another exhaust gas converter. As soon as the exhaust gas heat storage means exceeds the temperature of the heat storage means, there will again be a transfer of heat from the exhaust gas to the heat storage means and the prevention of overheating of the system will be caused by emptying the heat exchanger, when the above-mentioned condition is fulfilled.

The invention will now be described in more detail with reference to the working examples thereof as shown in the drawing.

LIST OF THE SEVERAL VIEWS OF THE DRAWINGS

DETAILED DESCRIPTION OF WORKING EMBODIMENT OF THE INVENTION

Figure 1:
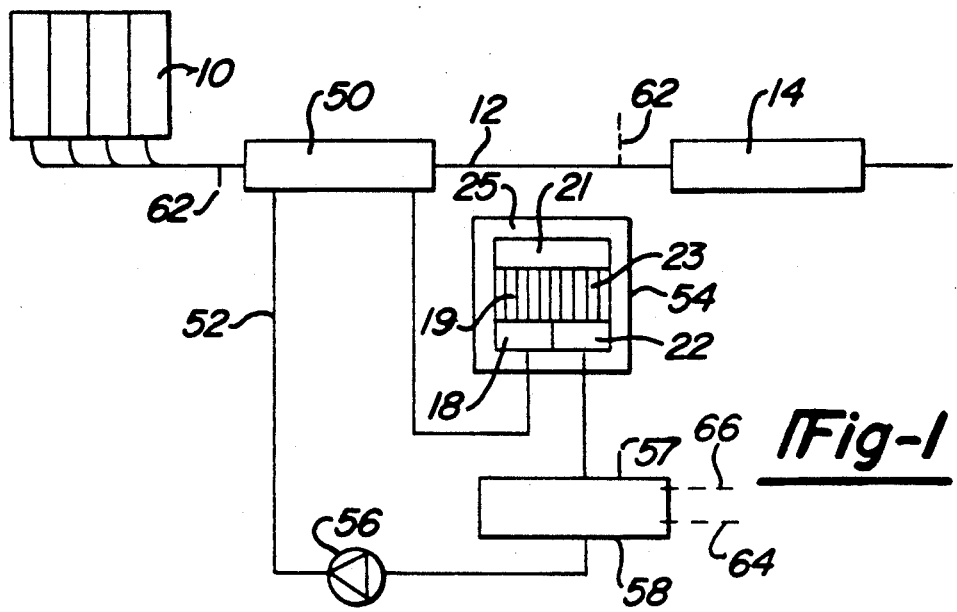
FIG. 1 represents a diagrammatic view of the exhaust gas system of an automobile IC engine with a heat exchanger and a heat storage means forming the heat absorbing means.

The exhaust gases produced in an IC engine 10 are led off via a exhaust gas duct 12, which causes the exhaust gases to pass through a heat exchanger 50 through which the exhaust gases continuously flow. The heat exchanger 50 is included in a heat transfer circuit 52, which includes a heat storage means 54 therein. The heat transfer circuit furthermore comprises a pump 56 and a storage means 58 which has a ventilating means 57 and serves to take up the heat vehicle fluid circulating in the heat transfer circuit.

The heat storage means 54 possesses an inlet chamber 18 and an outlet chamber 22. The inlet chamber 18 is followed by a first storage chamber 19. A second storage chamber 23 (connected with the outlet chamber 22) is placed in parallel to this first storage chamber 19 so that the second chamber receives the heat vehicle fluid, emerging from the first storage chamber 19, via a direction changing chamber 21 spanning the two storage chambers 19 and 23 and in which the fluid flows to the outlet chamber 22.

The chambers 18, 19, 21, 22 and 23 are surrounded by an insulating zone 25.

The heat storage means 54 is for instance in the form of a storage means storing heat in the form of latent heat designed for high efficiency at low engine speeds and which has to be protected against the effect of high temperatures of the exhaust gas occurring at high speeds of rotation of the engine and/or high loads thereof in order to avoid overheating and damage to the heat storage means 54.

In the case of the form of the invention shown in FIG. 1 the heat exchanger 50 is placed higher up than the compensating container 58 so that when the pump 56 is not operative, the flowable heat vehicle fluid will drain from the heat exchanger 50 under the effect of gravity, the level in the compensating container then rising from the operating level 64 to the neutral or resting level 66. Because the heat vehicle fluid has left the heat exchanger 50 the high temperatures, which would otherwise damage the heat storage means 54 are not able to be transmitted to the heat storage means 54.

As soon as the heating circuit 52 is to be made operational again, the pump 56 is switched on so that the heat vehicle fluid is again pumped via the heat exchanger 50 to the heat storage means 54 and then either transfers stored heat to the exhaust gas in the heat exchanger or in order to charge the heat storage means 54 transfers heat from the exhaust gas to the heat storage means 54.

Figure 2:
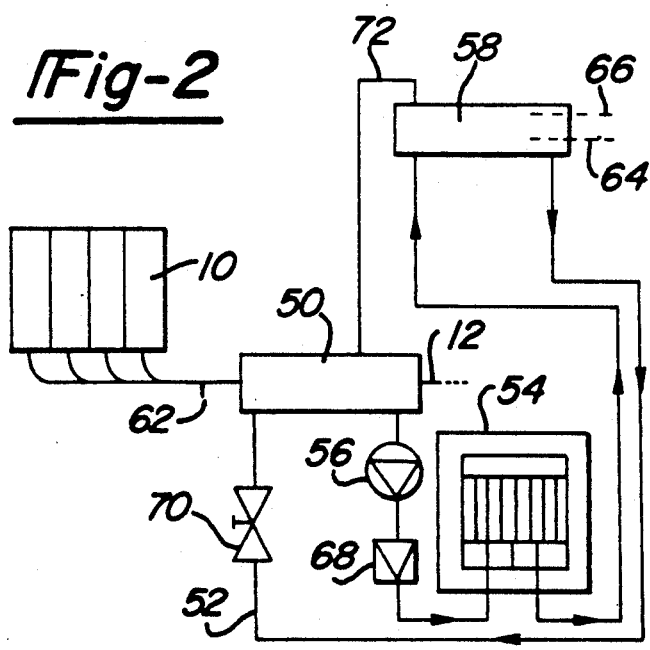
FIG. 2 shows a modified form of the arrangement of FIG. 1 with a heat exchanger and a heat storage means.

In the case of the modified form of the invention depicted in FIG. 2 the compensating container 58 is placed at a higher level than the heat exchanger 50, and between the heat exchanger 50 and the heat storage means 54 there are the following, arranged in the direction of pumping by the pump 56 and placed thereafter: a check valve 68 and the heat storage means 54. In the direction of pumping after the heat storage means 54 and between it and the heat exchanger 50 there is a shut off valve 70.

In the case of this form of the invention the heat exchanger 50 is emptied by the pump 56, which after the closing of the shut off valve transfers the heat vehicle fluid to the compensating container 58, whence it is prevented from flowing back by the check valve 68 between the heat storage means 54 and the pump 56. After the opening of the the shut off valve 70 the heat vehicle fluid will flow under the effect of gravity to the heat exchanger 50. The heat exchanger 50 and the compensating container 58 are connected together by an equalizing air duct 72.

Figure 3:
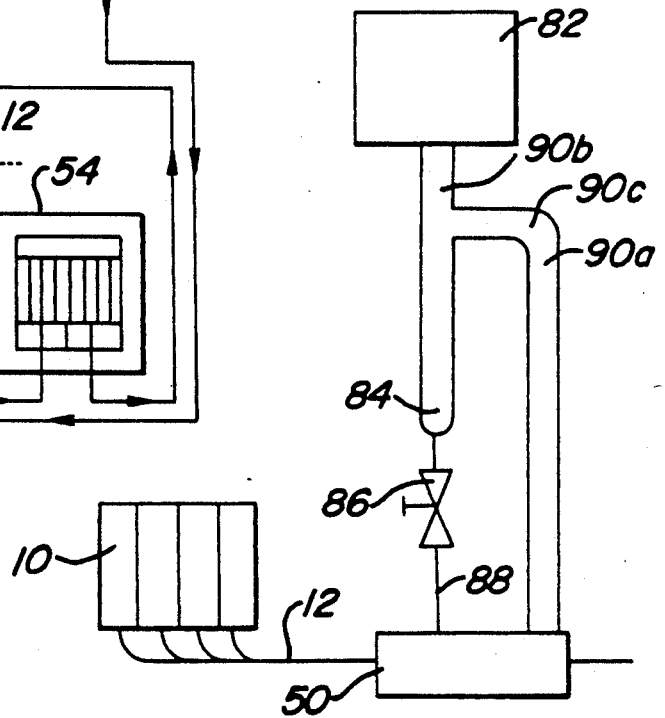
FIG. 3 illustrates an exhaust gas system with a heat exchanger and a condenser as a heat absorbing means.

FIG. 3 shows a condenser 82 included ion the heat transfer circuit 52 and such condenser 82 is associated with the heat exchanger 50, acting as a heat source, as a heat absorbing means. The heat vehicle fluid in the heat transfer circuit is so selected that it condenses at the operating temperature of the condenser 82.

The heat vehicle fluid which has condensed at the condenser 82 flows under its own weight into a storage means 84 placed at a lower level than the condenser 82, such storage means 84 being connected via a return duct 88, which may be shut off by a valve 86, with the heat exchanger 50.

The heat vehicle fluid evaporating in the heat exchanger 50 passes via the duct sections 90a and 90b to the condenser. The two duct parts 90a and 90b are so offset from each other in a horizontal direction by intermediate duct section 90c that the condensate running downwards in the duct part 90b connected with the condenser 82 may collect in the storage means 84. However, there is also the possibility of arranging a first duct for the vapor of the heat vehicle fluid between the heat exchanger 50 an inlet to the condenser 82 and to arrange a second duct for the return flow of the condenser between an outlet of the condenser and the heat exchanger, the second duct having the storage means 84 and the shut off valve 86 placed thereon.

As long as the valve 86 is opened and the heat exchanger 50 supplies the heat of evaporation, the heat vehicle fluid circuit will be maintained, since the condensate will be able to flow back to the heat exchanger without opposition and then will be evaporated continuously in the same.

As soon as the valve 86 is closed, it will no longer be possible for the condensate to flow back to the heat exchanger 50. In fact, the condensate will collect in the storage means 84. The heat exchanger 50 will be emptied by the evaporation of the heat vehicle fluid therein so that the circuit of the heat vehicle fluid will be interrupted.

It is only when the valve 86 is opened that the heat vehicle fluid in a liquid state will run back to the heat exchanger 50 from the storage means again 84 and will then pass to the condenser 82 wherein it will condense with the surrender of heat and flow back into the heat exchanger 50.

I claim:

1. A method for charging a heat absorbing means comprising:
   providing an internal combustion engine having an exhaust means;
   providing a heat exchanger operatively coupled with the exhaust means;
   providing a heat transfer circuit including a heat absorbing means with a flowable heat vehicle fluid for circulating in said heat transfer circuit, said heat transfer circuit operatively coupled with said heat exchanger;
   selectively passing said flowable heat vehicle fluid through said heat exchanger for connecting said heat exchanger with said heat transfer circuit for exchanging heat between said flowable heat vehicle fluid and said heat exchanger;
   passing said flowable heat vehicle fluid into said heat absorbing means for charging said heat absorbing means;
   selectively terminating flow of said flowable heat vehicle fluid through said heat exchanger for disconnecting said heat exchanger with said heat transfer circuit;
   withdrawing said flowable heat vehicle fluid from said heat exchanger; and
   transferring said flowable heat vehicle fluid to said heat absorbing means.

2. The method as claimed in claim 1, characterized in that said heat vehicle fluid is transferred by a pump from a storage means, placed at a lower level than the heat exchanger through the heat exchanger and for disconnection of the heat exchanger the pump is turned off.

3. The method as claimed in claim 1, characterized in that the heat vehicle fluid is passed by a pump through the heat exchanger and in that for disconnection of the heat exchanger the heat transfer circuit is shut off in the direction of pumping between the storage means and the heat exchanger and the heat exchanger is emptied by the pump into the storage means, which is placed higher up than the heat exchanger whereafter the pump is turned off.

4. The method as claimed in claim 1 using a heat vehicle fluid condensing in the operational temperature range of the heat absorbing means, characterized in that the heat vehicle fluid condensed at the heat absorbing means is returned under the action of gravity via the storage means to the heat exchanger and in that for disconnection of the heat exchanger the return connection between the storage means and the heat exchanger is interrupted.

5. A device for charging a heat absorbing means comprising:
   an internal combustion engine having an exhaust means;
   a heat exchanger operatively coupled with the exhaust means;
   a heat transfer circuit including a heat absorbing means with a flowable heat vehicle fluid for circulating in said heat transfer circuit, said heat transfer circuit operatively coupled with said heat exchanger;
   means for selectively passing said flowable heat vehicle fluid through said heat exchanger for connecting said heat exchanger with said heat transfer circuit for exchanging heat between said flowable heat vehicle fluid and said heat exchanger such that said flowable heat vehicle fluid is passed through said heat absorbing means for charging said heat absorbing means;
   means for selectively terminating flow of said flowable heat vehicle fluid through said heat exchanger for disconnecting said heat exchanger with said heat transfer circuit such that said flowable heat vehicle fluid is withdrawn from said heat exchanger and transfers heat to said heat absorbing means.

6. The device as in claim 5 characterized in that the heat exchanger is arranged higher up than a compensating container, placed in the heat transfer circuit, for the heat vehicle fluid and in that a pump is arranged lower down than the neutral level of compensating container and in the direction of pumping between the compensating container and the heat exchanger.

7. The device as in claim 5 characterized in that the heat exchanger is lower down than a compensating container, arranged in the heat transfer circuit, for the heat vehicle fluid, in that in the direction of pumping between the compensating container and the heat exchanger a shut off valve is arranged in that between the heat exchanger and the compensating container the following are arranged in sequence: a pump, a check valve and the heat absorbing means.

8. The device as in claim 5 characterized in that the heat absorbing means is placed higher up than the heat exchanger, in that the heat transfer circuit comprises a condensate return duct opening into the heat exchanger, in that the condensate return duct comprises a storage means and in that the condensate return duct is able to be shut off at a point between the storage and the heat exchanger.

* * * * *